Patented Mar. 31, 1931

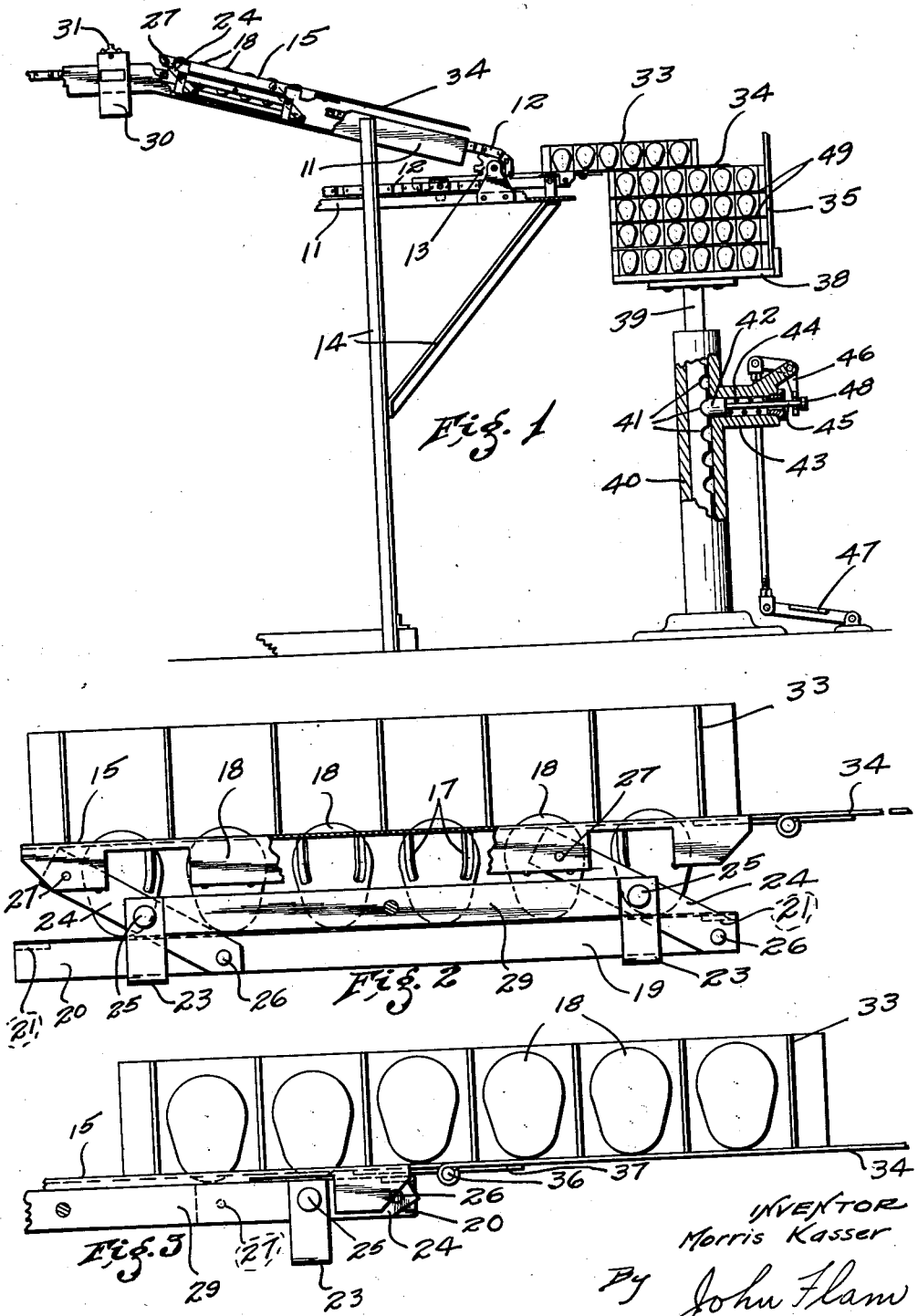

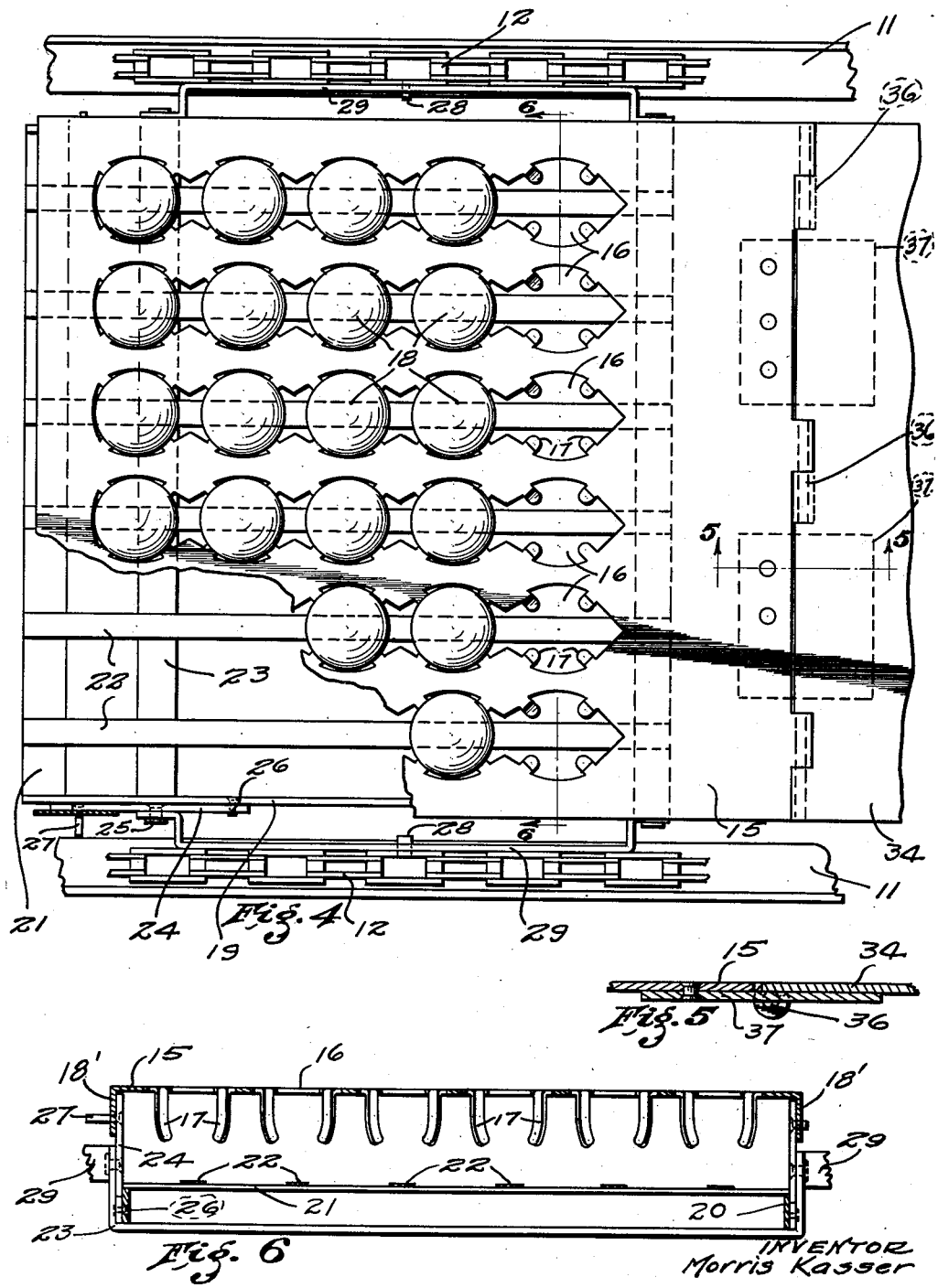

1,798,608

UNITED STATES PATENT OFFICE

MORRIS KASSER, OF SAN FRANCISCO, CALIFORNIA, ASSIGNOR TO KASSER EGG PROCESS CO., OF SAN FRANCISCO, CALIFORNIA, A CORPORATION OF CALIFORNIA

EGG LOADER AND UNLOADER MACHINE

Application filed March 29, 1928. Serial No. 265,592.

This invention relates to the treatment of eggs, such as processing, candling, or grading; and particularly to a scheme for loading or unloading the machine.

In my prior application, Serial No. 147,464, filed November 10, 1926 and entitled "Egg processing machine", I describe an apparatus including in general an endless conveyor system that carries a number of egg trays through one or more treating stations. The trays carrying the eggs can be unloaded at one end of the machine at a place where the conveyor is guided from an upper to a lower reach. This is accomplished by providing a tray having pockets for the eggs, and as the tray is carried to the lower reach, the eggs are freed from these pockets and can be slid off the tray after a filler is placed over them.

It is one of the objects of my invention to improve over this arrangement, and especially to simplify the structure.

It is another object of my invention to provide a novel form of egg tray that serves to support the eggs in a more secure manner, and that can be loaded with eggs without material danger of any of them breaking.

It is still another object of my invention to make it possible automatically to count the number of trays of eggs that pass through the machine.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Figure 1 is an elevation of the unloading end of a machine embodying my invention;

Fig. 2 is an enlarged detail view, partly in section of a tray embodying my invention and loaded with eggs;

Fig. 3 is a view similar to Fig. 2, but showing the eggs being removed from the tray;

Fig. 4 is a plan view of a tray shown as partly loaded, on a conveyor;

Fig. 5 is a sectional view on an enlarged scale, taken along plane 5—5 of Fig. 4; and Fig. 6 is a sectional view taken along plane 6—6 of Fig. 4.

The egg treating machine is shown as including spaced angle irons 11 (Figs. 1 and 4) on the horizontal legs of which there are accommodated the sprocket chains 12. Sprocket wheel 13 leads the chain 12 from the upper onto the lower reach of the machine. Framework 14 indicated in Fig. 1 is used to support the various parts of the apparatus. The conveyor chains 12 are used to carry egg trays in succession toward the unloading end of the machine. Before proceeding further with the general description, the tray structure will be described, and for this purpose, reference is to be had to Figs. 2, 3, 4, 5, and 6.

Each tray has an upper sheet metal tray member 15. This is provided with a series of apertures 16 from the edges of which are struck downwardly, the egg supporting fingers 17. These apertures can be filled with eggs 18. As shown in Fig. 4, the apertures 16 can be connected, to reduce weight. At a pair of its edges, it is provided with a depending flange 18', whereby it is strengthened.

This superstructure is arranged to coact with a tray substructure, in such a way that they are movable together or apart; this relative movement can be made use of either to release the eggs from the pockets 16, or else to form a rest for the eggs when they are in the pockets.

This substructure includes a frame 19, having depending flanges 20 that can telescope under flanges 18' of the sheet metal member 15. Wide flat bars 21 connect these flanges 20, and disposed on these bars is a series of strips 22. These strips conform in position with the rows of apertures 16, and are narrow enough to permit movement of these strips between fingers 17. To strengthen the substructure, cross braces 23 are provided; and these are U-shaped so that strips 22 can move downwardly. This downward movement is limited by the bottom of flanges 20 coming into contact with these braces; see Fig. 2.

I shall now described how the superstructure and the substructure are connected to permit these relative movements. Links 23 are provided, pivoted at an intermediate point on pins 25 fastened into the legs of members 23. One end of link 24 is pivotally connected to flange 20 as shown at 26; and the other end, to the flange on the member 15, as indicated at 27. It is thus seen that a balance is effected about pivots 25 for both the lower and upper structures. Normally the weights of these structures are such that the upper part counterbalances the lower, bringing the tray into collapsed position, as in Fig. 3; but when eggs are deposited onto strips 22, the lower structure is depressed, and the tray takes the position of Fig. 2. Since the eggs are not dropped onto bars 22 through any distance when deposited on strips 22, the danger of breakage is eliminated. Thus the bottom of the tray may be said to be resiliently urged downwardly as the weight of the eggs is imposed thereon to form the pockets.

The connection between the tray and chains 12 can be a pivotal one; such for example as provided by pins 28 (Fig. 4) fastened to the chain and entering into apertures in the handle members 29. These handle members can be formed integral with the braces 23, and their lower sides can engage the guiding angles 11.

Since the tray has an upper portion 15 that is lifted up whenever the tray is filled, as indicated in Figs. 1 and 2, this can be made use of to count the number of filled trays that pass a given point on the machine; and the empty trays pass this point without affecting the counter. Thus I show a counter 30 on framework 14 located at a point just before the trays discharge. This counter can be operated by the aid of a spoke wheel 31 in the path of the protruding pin 27 on the end of link 24. When the tray is collapsed, this pin passes by the wheel 31 without turning it.

It is of course understood that there are a series of trays carried around by the conveyor 11 and that sprockets 13 (Fig. 1) guide conveyor 12 from the upper to the lower reach. It is at this point that the eggs can be unloaded. This can be accomplished by pressing an empty filler such as shown at 33 (Fig. 2) onto the tray and thereby causing it to collapse and to place the eggs 18 into the filler spaces. Then the filler 33 with the eggs can be slid off the tray. This operation of pressing the filler 33 onto the eggs can be performed at any time between the time just before the tray reaches sprocket 13, and the time when the tray starts moving away from this sprocket on the lower reach. The eggs thus placed in the filler can be moved off the tray onto a table, whence it can be lifted and deposited into an egg crate.

Preferably, however, I provide a shelf or table extension 34 for each tray upon which the filler 33 can be slid. This extension can serve as a shovel for depositing the eggs directly into an open sided egg crate 35, into which the shelf 34 partly extends, as clearly shown in Fig. 1. As the tray moves toward the left, the shelf 34 is withdrawn from below the eggs, and at the same time, filler 33 is moved by hand into crate 35. In order to facilitate operation of this unloading scheme, shelf or table 34 is hinged to the tray, as shown at 36 (Fig. 4). One or more stops 37 prevent the table from moving downwardly too far, but do not limit the upward movement of the table when it comes in contact with any obstruction as the tray moves downward along the conveyor frame.

I provide a mechanism whereby crate 35 can be lowered in a step-by-step mechanism, whereby it is assured that table 34 will move directly over the top layer in the crate. For this purpose, I provide a crate support 38 that is fastened to the top of a vertically movable columnar support 39. This member 39 is disposed in a vertical guide 40. Notches 41 in member 39 cooperate with a pawl or obstruction 42 guided in extension 43. When this obstruction is withdrawn, the member 39 can drop until the obstruction engages the succeeding notch. A spring 44 urges the pawl 42 into engagement with the notches.

However, the pawl can be moved outwardly either by foot or by hand. For this purpose, it is provided with a stem 45 engaged by a bell crank lever 46, which in turn can be pulled by depressing a treadle 47. A head 48 on the stem 45 ensures that, when the treadle 47 is depressed, and the lever 46 thereby rotated in a counterclockwise direction, the stem 45 will be moved to the right. Button 48 can be manually pulled outwardly to secure the same results.

When the pawl 42 is thus pulled away to release member 39, the pawl can be freed, so that it will snap into the next higher notch 41 as the member 39 moves downwardly. These notches 41 are spaced apart a distance equal to the depth of one layer of eggs, including a filler 33 and a flat 49.

It is evident that crate 35 can be lowered step-by-step as the layers of eggs are deposited therein, so as to keep the top level of the eggs in the crate just below the table or shelf 34. The operator can urge the filler 33 onto the eggs even before they reach the lower reach of the conveyor, and thereby makes it possible expeditiously to move the eggs onto table 34; and thence into crate 35, during that interval in which the table or shelf 34 extends into crate 35.

I claim:

1. In an egg tray, a top and a bottom portion, the top portion having egg receiving recesses, and the bottom portion being arranged to engage the bottom of the eggs to free them from the recesses, said top and bottom portions being relatively movable, and means connecting the two portions while permitting the relative movement.

2. In an egg tray, a pair of relatively movable members, and means whereby relative movement between said members is secured in response to the imposition of the weight of the eggs in the tray.

3. In an egg tray, a top and a bottom portion, the top portion having egg receiving recesses, and the bottom portion being arranged to engage the bottom of the eggs, and means connecting the top and bottom portions comprising a link pivoted to each portion.

4. The tray as set forth in claim 3, in which the link is also pivoted at an intermediate point thereof to balance the portions one against the other.

5. The tray as set forth in claim 3, in which the link is pivoted at an intermediate point thereof on the lower portion of the tray.

6. In an egg tray, means providing a series of spaces in which eggs can be held, and also providing rests upon which the bottoms of the eggs rest, and a shelf-like extension for said means.

7. In an egg tray, means providing a series of spaces and rests for the eggs below the spaces, a shelf-like extension for said means, and means for freeing the eggs from the spaces.

8. In an egg tray, means providing a series of apertures in which eggs can be held, and also providing rests below the spaces for the eggs, and means whereby the eggs can be urged to be entirely above the edges of the aperture.

9. In an egg tray, a top and a bottom portion, the top portion having egg receiving recesses and the bottom portion being arranged to engage the bottom of the eggs and to free them from the recesses, said top and bottom portions being relatively movable, means connecting the two portions in such a way as to permit said relative movement, and a table extension for one of the two portions.

10. In an egg tray, a top portion having egg receiving recesses and a pair of depending flanges, a bottom portion having parts engaging the bottom of the eggs, said bottom portion having a frame telescoping under the flanges, and a link connection between the two portions, pivotally connected to these portions at its ends, and connected pivotally to one of said portions at an intermediate point of the link, whereby the portions are balanced one against the other; and whereby a load of eggs will cause these portions to move apart.

11. The combination as set forth in claim 10, with the addition of a table extension to one of the two tray portions.

12. In an egg tray, means forming a series of egg receiving apertures, and means cooperating with said apertures to form pockets of variable depth, whereby eggs can be deposited in the pockets when they are depressed to prevent breakage.

13. In an egg treating machine, a conveyor one or more trays carried by said conveyor, and means for transferring the eggs directly from the tray into an egg case.

14. In an egg treating machine, a conveyor one or more trays carried by said conveyor, and a projection on the tray for transferring the eggs directly from the tray into an egg case.

15. In an egg tray, a flat sheet having a strengthening ridge adjacent from the sides, said sheet having apertures therein and fingers struck downward from the edge of the apertures to form pockets.

16. In an egg tray a flat sheet, and fingers struck from the sheet to extend below the sheet to form pockets, said fingers being spaced apart at the bottom of the pocket to leave a clear space, whereby the eggs can be lifted from the pockets from below.

MORRIS KASSER.